Figure 1:
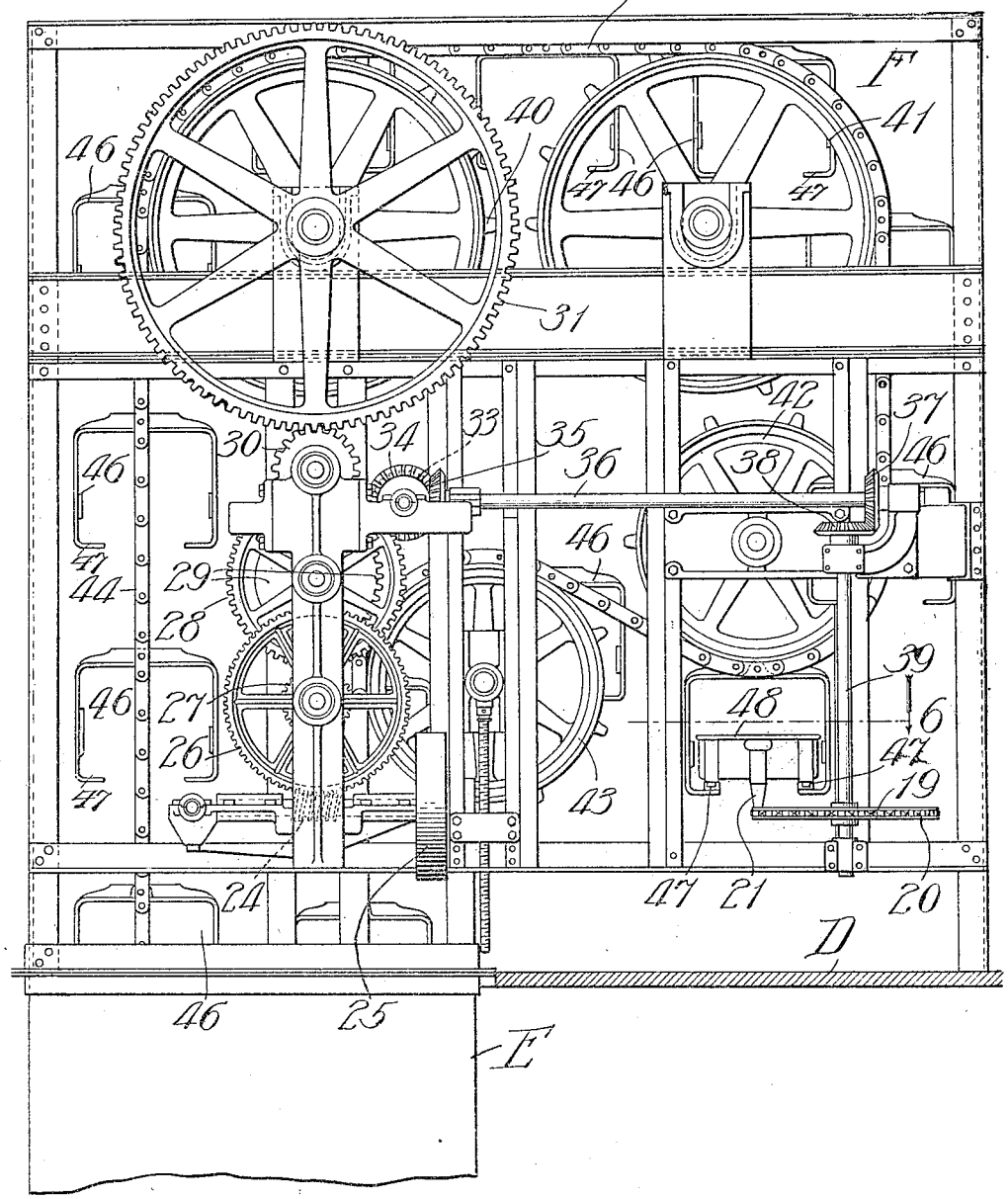

J. T. H. PAUL.
PASTEURIZER EQUIPMENT.
APPLICATION FILED APR. 21, 1910.

981,303.

Patented Jan. 10, 1911.

6 SHEETS—SHEET 2.

Fig. 2.

Witnesses:
Chas. Gaylord
Chas. H. Buell

Inventor:
John T. H. Paul.
By Dyrenforth, Lee, Chritton & Wiles,
Attys.

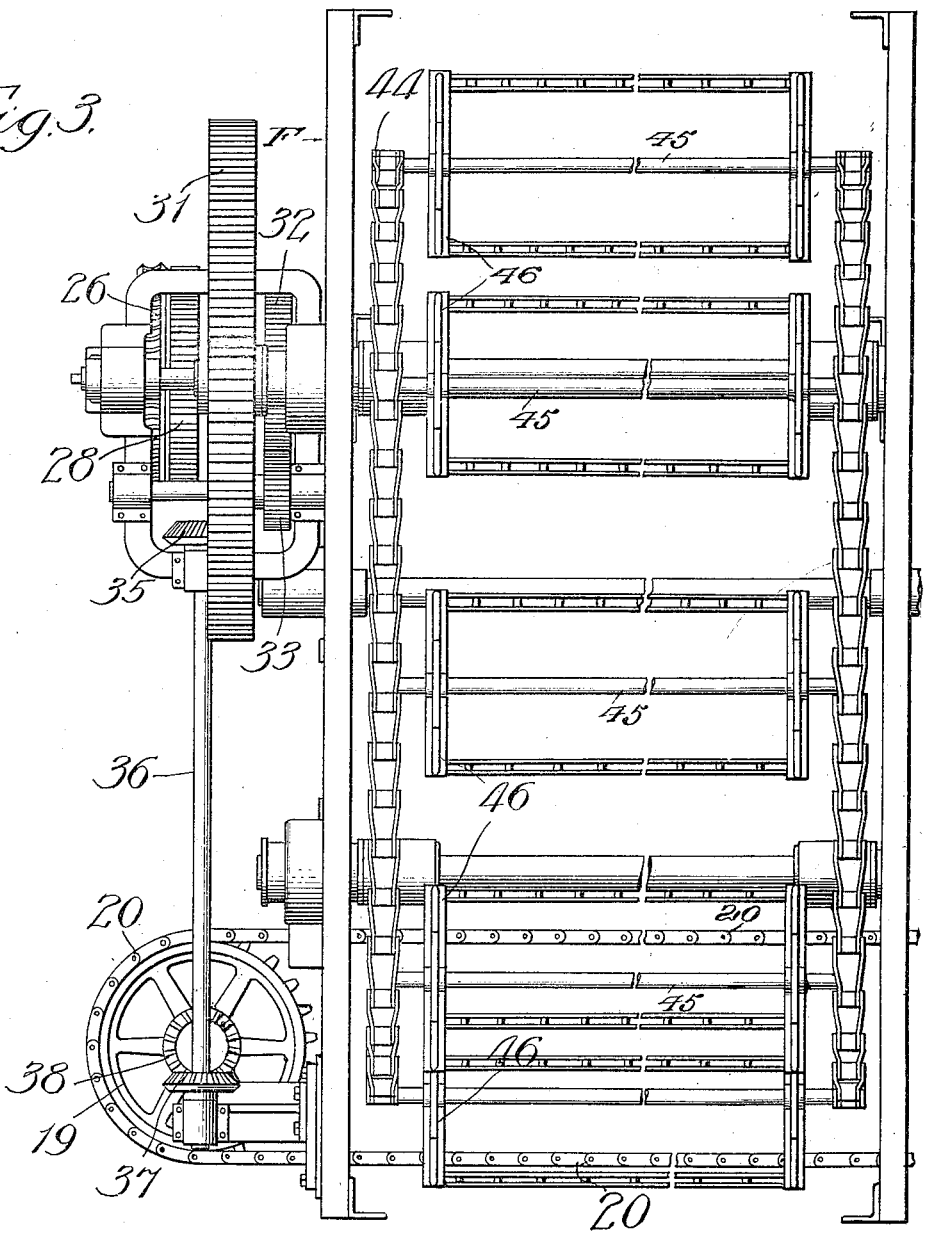

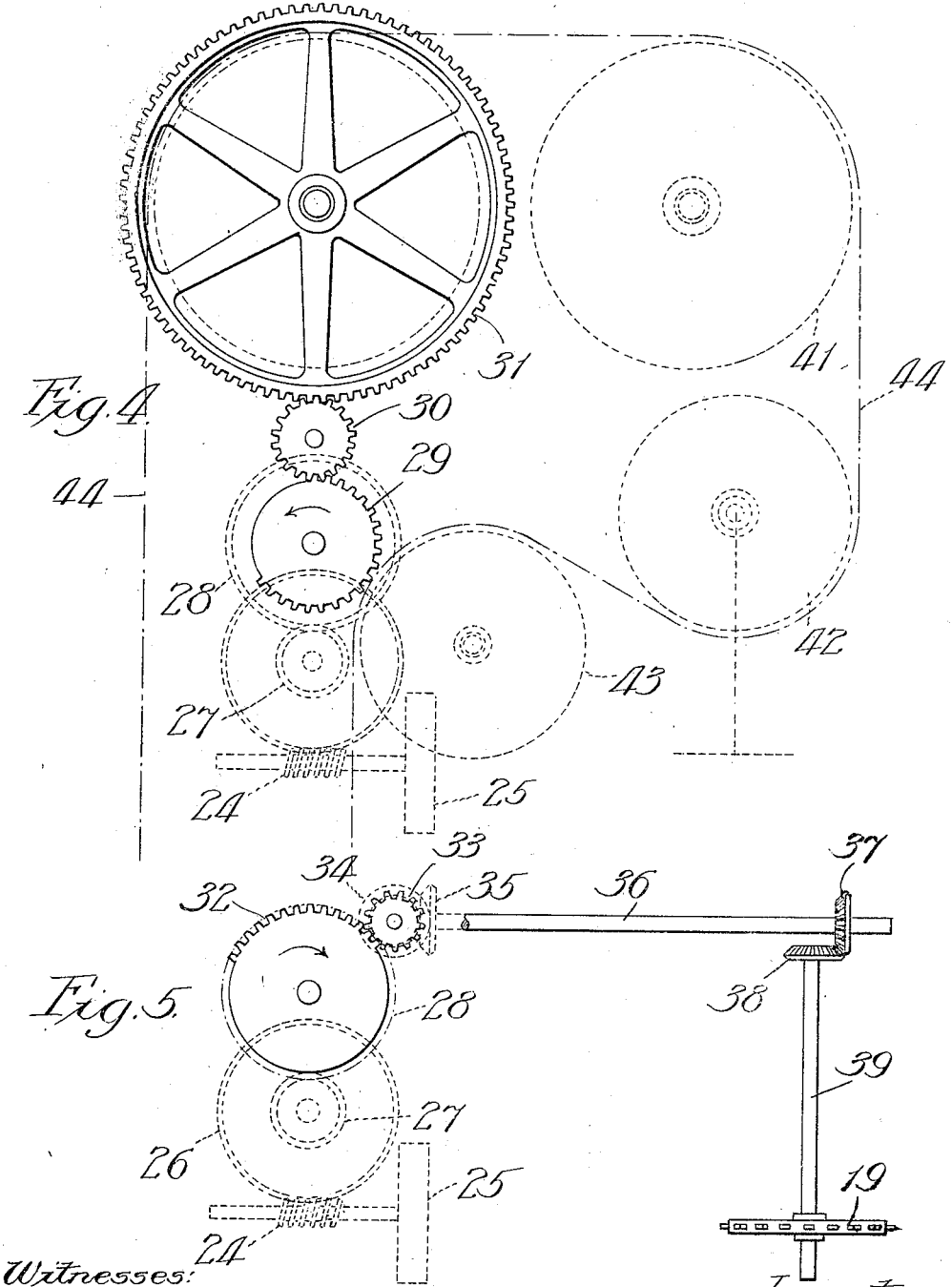

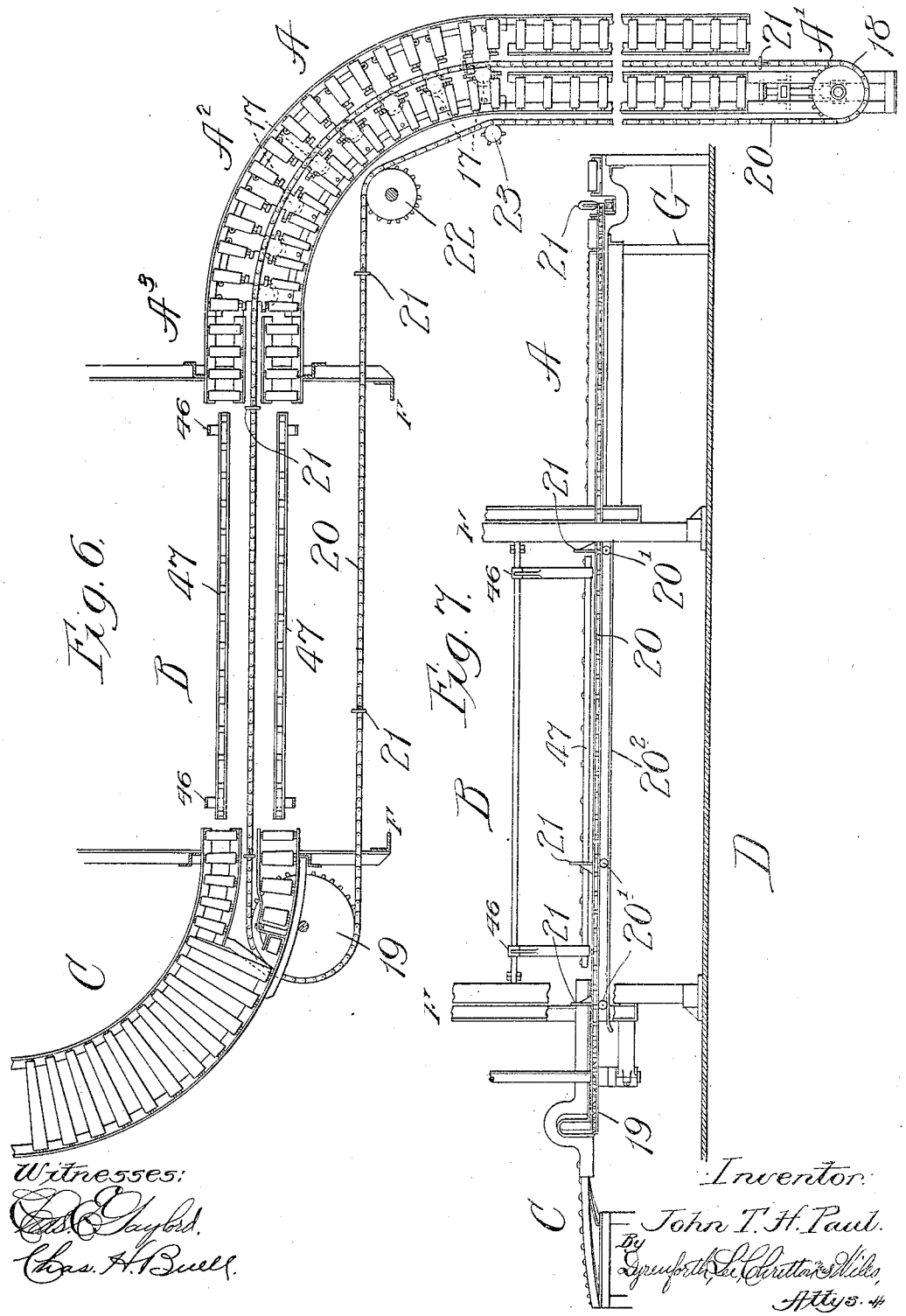

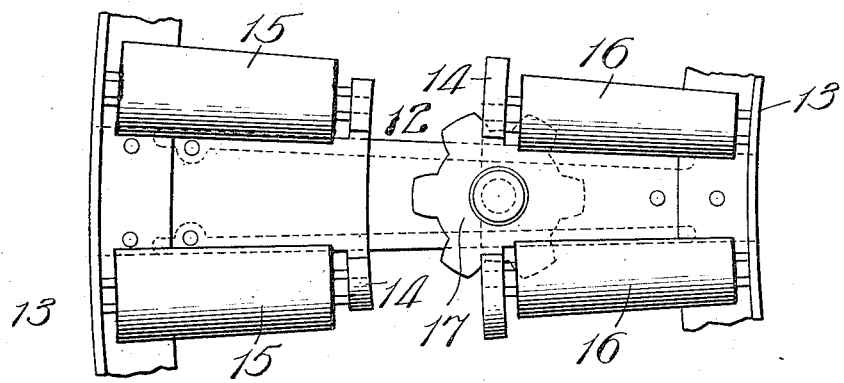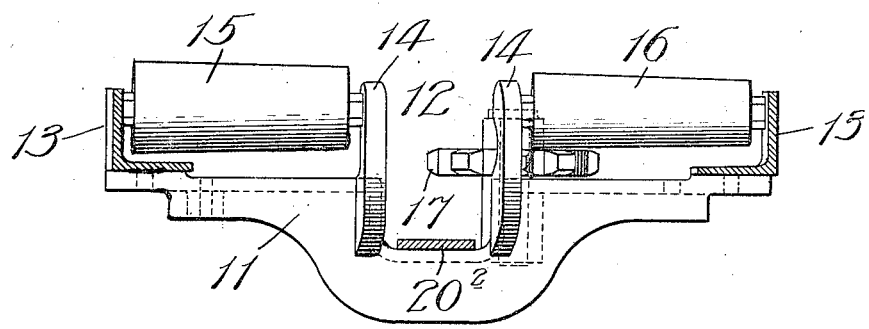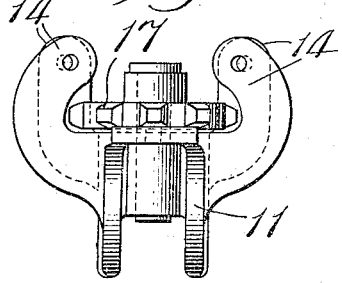

UNITED STATES PATENT OFFICE.

JOHN T. H. PAUL, OF CHICAGO, ILLINOIS, ASSIGNOR TO E. GOLDMAN & CO., INC., OF CHICAGO, ILLINOIS, A CORPORATION OF ILLINOIS.

PASTEURIZER EQUIPMENT.

981,303.  Specification of Letters Patent.  Patented Jan. 10, 1911.

Application filed April 21, 1910. Serial No. 556,899.

*To all whom it may concern:*

Be it known that I, JOHN T. H. PAUL, a citizen of the United States, residing at 3900 Union avenue, Chicago, in the county of Cook and State of Illinois, have invented a new and useful Improvement in Pasteurizer Equipments, of which the following is a specification.

My invention relates to an improved equipment for pasteurizing apparatus of the class involving a tank for containing the pasteurizing liquid through which receptacles containing the material to be pasteurized are caused to travel intermittently on a carrier; and it relates, more particularly, to means for conveying the receptacles, in baskets or holders, to the tank for treatment therein, and means for delivering them from the tank after the pasteurizing, and to so timing the conveying and delivery operations relative to the intermittent travel through the tank as to render the operation of the apparatus regular and reliably continuous.

Referring to the accompanying drawings:—Figure 1 is a view in side elevation, partly sectional, showing the upper-end portion of a pasteurizer-tank surmounted by the frame-work which supports the mechanism for intermittently carrying the material to be pasteurized through the tank. Fig. 2 is a broken view presenting the showing of Fig. 1 as regarded from the receiving end of the apparatus, and Fig. 3 is a plan view of the same. Fig. 4 is a diagrammatic view illustrating the intermittent operation of the mechanism for carrying the receptacles through the tank, and Fig. 5 is a similar view illustrating the intermittent operation of the mechanism for feeding the receptacles to the said carrying means. Fig. 6 is a broken sectional plan view of the feeding and delivering conveyers with interposed carrier, the section being taken at line 6, Fig. 1, and Fig. 7 is a view of the same in elevation showing the platform in section. Figs. 8, 9 and 10 are, respectively, plan, side and end views of one of the similar roller sections of which the curved portion of the feed-conveyer is composed, the rollers being removed in Fig. 10.

To facilitate understanding the plan of construction and operation of the entire apparatus the same may be generally described as follows, with more particular reference to Figs. 6 and 7 and to pasteurizing bottled beer, or the like, in crates, baskets, or other suitable forms of holders: The bottle-filled holders are loaded upon a conveyer A, which is caused to move intermittently at regular intervals and feed the holders to an endless carrier, denoted B, as a whole, which travels vertically in the pasteurizer-tank and intermittently like the feed-conveyer A but in alternation therewith. Thus, each time a holder-receiving member of the carrier is brought into registration with the discharge-end of the feed-conveyer, the carrier is arrested and the conveyer is set in motion to advance a holder, or set of holders, upon such registering member, whereupon the conveyer is arrested and the carrier is set in motion upon its course through the tank. Whenever a holder-laden member of the carrier, in traveling through its course, reaches the position of registering with the feed, the holder advanced by it upon such member supplants the holder on the latter by shoving it off upon a delivery-conveyer, represented at C, which is preferably of the well-known gravity variety and thus downwardly inclined to adapt the holders that are delivered to it to travel upon its rollers to the ultimate point of delivery.

An object of the present improvement is to render the entire apparatus compact, so as to occupy the minimum space and simplify the mechanism, which is all supported on a floor or platform D and the upper end of the pasteurizer-tank E surrounded by such floor or platform, the tank rising from a lower support (not shown), and the supporting medium for the driving mechanism being an upright rectangular frame, denoted as whole at F in Fig. 1, surmounting the tank and platform and built substantially of structural-metal bars.

The conveyer A, supported on the platform D, comprises straight end-portions $A^1$ and $A^3$ and an intermediate curved portion $A^2$, the conveyer terminating at the tank; and it is built as a roller-track, of a plurality of sections, those forming the curved portion $A^2$ being each like that illustrated in Figs. 8, 9 and 10 and involving the following described construction: A transversely extending yoke 11 forms a depression or conduit 12 between its ends to admit a traveling conveyer-chain, hereinafter described. On the opposite ends of the yoke are provided bearings 13, 13, which are angle-irons extending continuously throughout the entire length of the conveyer, and bearings 14, 14, for each section are formed at opposite sides of the conduit as integral parts of the yoke. In these bearings are journaled the tapering rollers 15, 15 and 16, 16; and a sprocket-wheel 17 is journaled in horizontal position on the yoke to one side of the conduit to extend into the path through the latter. The sections forming the straight portions of the track are each of the described construction of those for the curved portion thereof except that the rollers are cylindrical and that the sections are devoid of sprocket-wheels. The double track thus formed to accommodate the outer length of the conveyer-chain is supported on and fastened to frame-work indicated at G in Fig. 7. A sprocket-wheel 18 is journaled at the receiving end of the track, and a relatively larger sprocket-wheel 19 is journaled on the frame F adjacent to the receiving end of the gravity-conveyer C; and an endless chain 20, carrying flights 21 at uniform intervals, passes about these sprocket-wheels to travel through the conduit formed by the yoke-depressions 12, wherein it engages the series of sprockets 17, and along the inner side of the conveyer where it is guided by sprockets at 22 and 23. To prevent the chain from sagging under its load, it is caused to ride on rollers 20¹ on a bed-plate 20² extending along the conduit 12 and throughout the length of the conveyer-chain.

The driving mechanism, or "movement," supported on the frame F is the following: A worm-shaft 24, to which the power is applied at a pulley 25, meshes with a worm-wheel 26 carrying a pinion 27 which meshes with a gear 28 having on its shaft a mutilated gear 29 to mesh with a pinion 30 engaging a large gear 31. The shaft which carries the mutilated gear 29 also carries a mutilated gear 32 to mesh with a pinion 33, the shaft of which also carries a beveled pinion 34 meshing with a similar pinion 35 on one end of a horizontal shaft 36 carrying a beveled pinion 37 in mesh with a similar pinion 38 on the upper end of the vertical shaft 39 of the sprocket 19. A pair of sprockets 40 is provided on the shaft of the gear 31, and sprockets 41, 42 and 43 are provided in pairs on their respective shafts journaled in the frame F, as represented, for passage about them of the endless chains 44 of the carrier B. At uniform intervals the chains 44 are connected by rods 45, on each of which, near its ends, are pivotally suspended, to always maintain a vertically depending position, members of a pair of hangers 46 of general rectangular or yoke shape with parallel roller-tracks 47, formed with channel-irons, connecting the members of each pair. These roller-tracks are, by preference, sufficiently long to seat a series, as three, bottle-holders 48 (Fig. 1), and correspond in length with that of the interval between flights 21 on the chain 20 to adapt each flight to advance, in each intermittent movement of the chain, a plurality of the holders upon the carrier B to the number thereof which a pair of the track-connected hangers 46 is adapted to hold, and to advance that number in each operation upon the delivery-conveyer.

The operation is as follows: The mutilated gears 29 and 32 are so relatively disposed as to cause the teeth upon them to mesh alternately with the pinions they respectively engage. In starting the machine, a pair of the hanger-tracks 47 may be presumed to be in registration with the discharge-end of the feed-conveyer A, then laden with a series of holders 48, with a flight 21 abutting against the rearmost holder; and the gear 32 may be presumed to be in initial engagement with the pinion 33. With the worm-shaft 24 then in motion, the mutilated gear 32 will turn the shafts 36 and 39 to drive the sprocket 19 until the teeth of that gear clear the pinion 33, which is just sufficient to drive the chain 20 to the extent of causing the respective flight 21 to advance the holders 48 ahead of it upon the hanger-tracks 47 then in position to receive the holder-series, which, in so advancing, will shove any holders in their path on the track off the latter upon the conveyer C for delivery. Upon cessation of the movement of the chain 20, the teeth of the mutilated gear 29 are in initial engagement with the pinion 30, causing the latter to drive the gear 31 and chains 44, by actuating the sprockets 40, until the teeth of that gear clear the pinion 30 when the teeth of the mutilated gear 32 will again be in initial engagement with those of the pinion 33, ready to repeat the intermittent movement of the chain 20. The intermittent movement of the chains 44 of the carrier B lowers the holder-laden tracks into the tank to remain in a stratum of the pasteurizing-liquid therein until the next movement of the chain 20 loads upon the next-succeeding pair of carrier-tracks thus brought into position, another series of holders, in the meantime placed upon the conveyer A. The continuous operation of the apparatus involves the repeated alternate movements of the chain 20 and carrier B, to intermittently advance each series of bottle-holders downwardly and upwardly through the tank E and bring the endless series of track-pairs successively into registration with the discharge-end of the feed-conveyer and to intermittently ride series of the bottle-holders upon the carrier-tracks, thereby effecting the removal of those on the latter, after pasteurization of their contents, to the delivery-conveyer C.

The type of pasteurizing apparatus to which my present improvement particularly relates is exemplified by the apparatus which forms the subject of United States Letters Patent No. 913,910, granted to me March 2, 1909. In that type of apparatus the carrier in the pasteurizer tank is a wheel-like body rotatable about its axis and carrying holders; and the carrier is rotated intermittently to alternate with the intermittent movements of a feed-conveyer, whereby packages containing the material to be pasteurized are conveyed upon the holders on the carrier, as they are arrested, at intervals, to register with the discharge-end of the conveyer, and the packages which have been passed through the tank are removed from their holders. The primary purpose of my improvement is to adapt the same principle of operation to the endless-chain form of carrier in a pasteurizing apparatus, thereby to attain the advantages peculiar to that form, including simplicity, compactness and comparatively moderate cost of construction, all of which are secured by the apparatus herein illustrated and described.

What I claim as new and desire to secure by Letters Patent is:—

1. In a pasteurizing-apparatus equipment, the combination of a tank for holding the pasteurizing medium, a frame rising above the tank, sprockets journaled in said frame, an endless-chain carrier working on sprockets in said frame to travel in the tank, hangers pivotally supported at intervals on the carrier-chains, an endless-chain roller-conveyer including a sprocket in said frame provided on the chain with flights spaced to correspond with the spaces between said hangers, said endless-chain roller-conveyer being so positioned relative to the endless-chain carrier as to convey thereto and remove therefrom the receptacles containing the material to be pasteurized, and a train of driving-gears on said frame, including a pair of mutilated gears for driving said carrier and conveyer intermittently in alternation with each other, for the purpose set forth.

2. In a pasteurizing-apparatus equipment, the combination of a tank for holding the pasteurizing medium, an endless-chain carrier traveling in said tank and having members of pairs of hangers pivotally supported at intervals on its relatively opposite chains, with roller-tracks connecting the members of each pair, a conveyer for carrying to said hangers holders containing material to be pasteurized, and driving mechanism for said carrier and conveyer operating to actuate them intermittently in alternation with each other, for the purpose set forth.

3. In a pasteurizing-apparatus equipment, the combination of a tank for holding the pasteurizing medium, a frame rising above said tank, sprockets journaled in said frame, an endless-chain carrier working on sprockets in said frame to travel in the tank and having members of pairs of hangers pivotally supported at intervals on its relatively-opposite chains, with roller-tracks connecting the members of each pair, an endless-chain roller-conveyer including a sprocket in said frame and provided on the chain with flights at intervals corresponding with those between said hangers, said endless-chain roller-conveyer being so positioned relative to the endless-chain carrier as to convey thereto and remove therefrom the receptacles containing the material to be pasteurized, and a train of driving gears on the frame, including a pair of mutilated gears for driving said carrier and conveyer intermittently in alternation with each other, for the purpose set forth.

JOHN T. H. PAUL.

In presence of—
L. HEISLAR,
R. SCHAEFER.